Feb. 11, 1930.  A. P. ADAM  1,746,809
DETECTOR FOR IDENTIFYING ELECTRIC CONDUCTORS
AND TESTING FOR SHORT CIRCUITS
Filed March 25, 1927   2 Sheets-Sheet 1
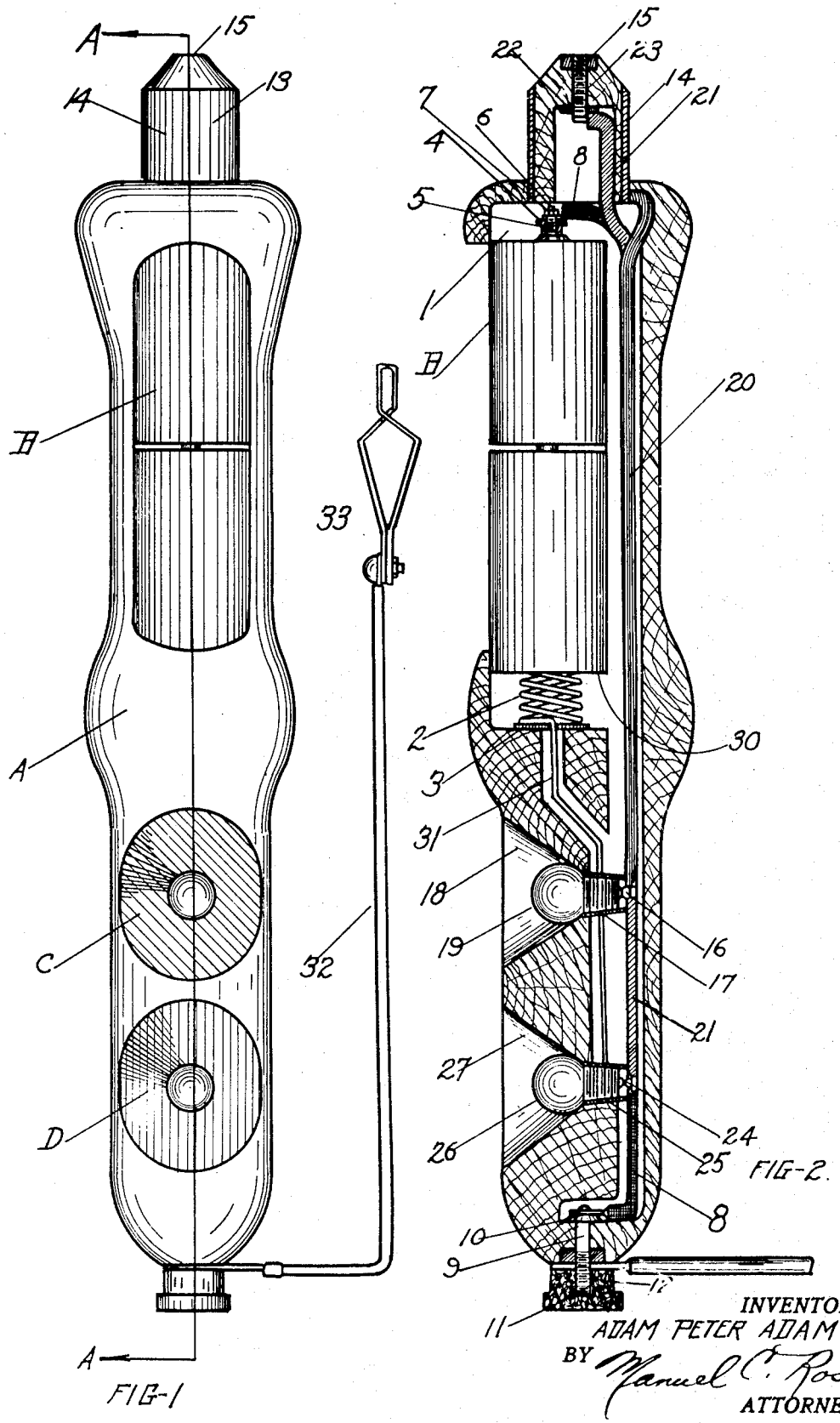
INVENTOR
ADAM PETER ADAM
BY Manuel C. Rosa
ATTORNEY

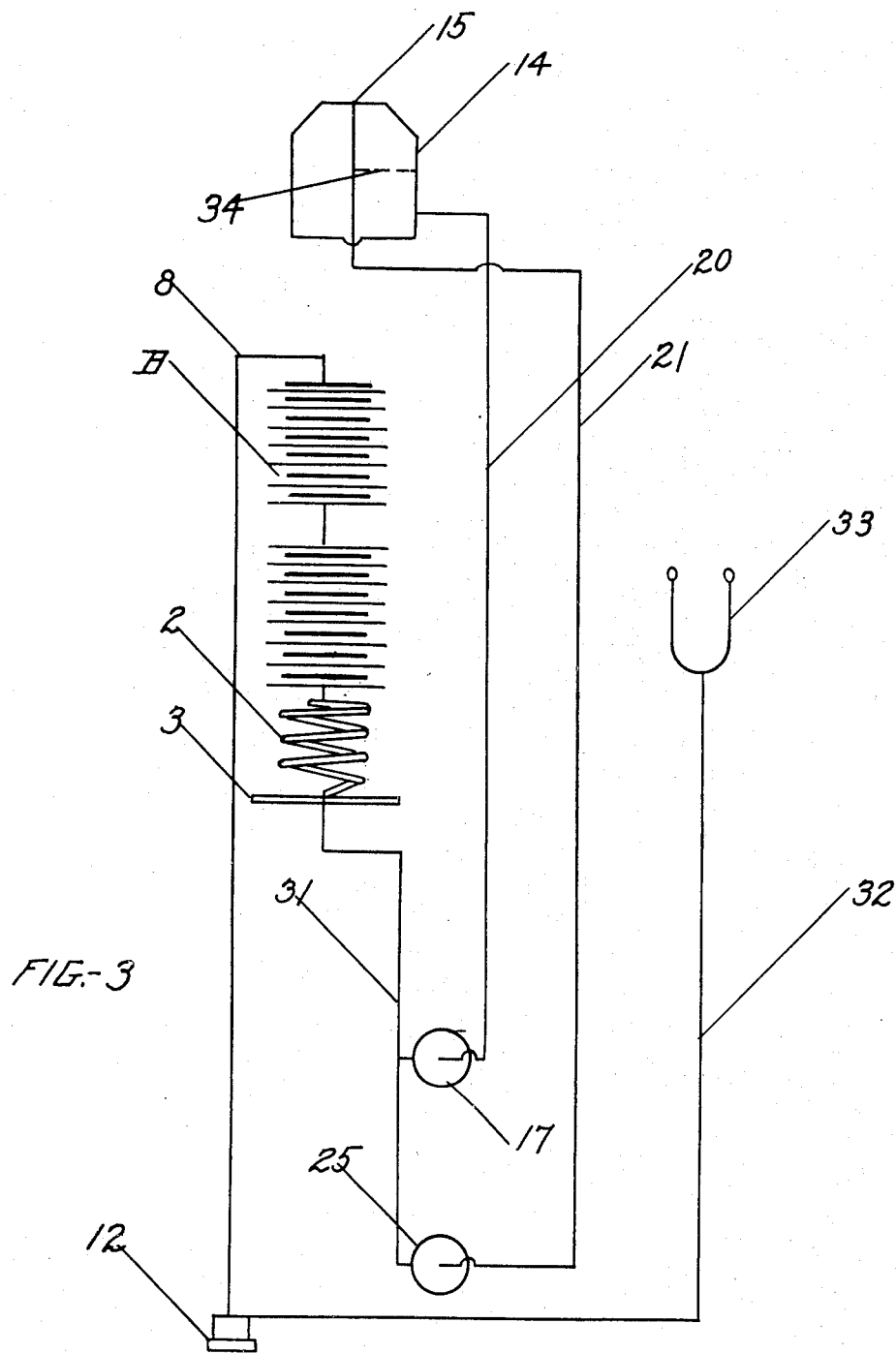

Patented Feb. 11, 1930

1,746,809

UNITED STATES PATENT OFFICE

ADAM PETER ADAM, OF FALL RIVER, MASSACHUSETTS

DETECTOR FOR IDENTIFYING ELECTRIC CONDUCTORS AND TESTING FOR SHORT CIRCUITS

Application filed March 25, 1927. Serial No. 178,420.

My invention relates to improvements in detectors for identifying electric conductors and locating short circuits having particular application in connection with the marked-wire system. The only approved wiring under National Electric Code is the marked-wire system wherein the live wire has a black insulation and the ground wire has a white colored insulation. The live wire should be connected to the center-contact of the lamp socket and the other wire to the shell of the socket. Should the live or black wire be connected to the shell, under certain conditions a person would receive a considerable shock. It therefore becomes important from the safety standpoint that the lamp sockets be tested to determine whether or not the wiring is correct. This is done before the current is turned on and at present a bell and battery unit is employed which has its disadvantages.

Furthermore, it is important to test an electric system for short circuits and the methods now in vogue are awkward and time-consuming. With the device hereinafter described the presence of short circuits may be determined simultaneously with the identification of the electric conductors.

It is an object of my invention to provide a detector for identifying electric conductors after the installation of electric wiring and before the current is turned on which is simple in structure and reliable in operation.

A further object of my invention is to provide a detector having two lights for use particularly with the marked-wire system which identifies electric conductors by lighting a light corresponding to the conductor.

A still further object of my invention is to provide a detector which in addition to identifying the electric conductors, detects the presence of short circuits.

Other objects and advantages will become apparent from a reading of the following detailed description taken in connection with the accompanying drawings.

I attain these objects and advantages by the mechanism illustrated in the drawings wherein:—

Figure 1 is a front elevational view of the detector showing the battery and the indicating lights with green and red backgrounds, the green light manifesting itself when the wiring is correct, the red light when the wiring is wrong and both lights glowing when a short circuit exists in the system.

Figure 2 is a cross-sectional view taken along line A—A of Figure 1 in the direction of the arrows.

Figure 3 is a diagrammatic view of the wiring within the detector.

Similar numerals refer to similar parts throughout the several views.

Referring to the drawings, A designates the receptacle which contains the battery unit B and the lamp socket C and D. The receptacle A may be made of any suitable non-conducting material and in the present instance is made of plastic wood which is forced with a gun into a mold containing the lamp sockets and wiring in a prearranged set-up so that they become embedded in the plastic wood. A suitable three piece core for forming the battery holding portion is also used. As the mode of manufacture does not constitute the subject matter of this invention rather the article illustrated in the drawing no further reference to the process of manufacture is deemed necessary as various methods known to the skilled artisan may be employed.

The battery B consists of two unit cells mounted end to end within the cylindrical recess 1 of the receptacle A, the center contact of the lower cell abutting the bottom of the upper cell. A helical spring 2 is disposed between the bottom of the lower cell and a wear plate 3.

A metal support 4 embedded in the plastic substance is provided with a contact point 5 which is adapted to engage the center contact of the upper cell. The contact point 5 has a threaded stem 6 which passes through an opening in the support 4 and a nut 7 is threaded on the stem to secure the contact 5 in place. A wire 8 having black colored insulation is connected to the stem 7 as by soldering and passes down the entire length of the receptacle and is connected to the post 9 at its extremity 10. The protuberant end 11 of the binding post is threaded to receive the binding nut 12. The wire 8 is insulated at all points except its points of contact with the stem 6 and the binding post 9.

The upper extremity of the receptacle is provided with a head portion 13 adapted to fit easily within a lamp socket, no threads being used. As shown in cross-section, the head portion has two terminals spaced apart, the outer terminal 14 resembling a ferrule enclosing an inner center terminal 15 which is insulated therefrom. The outer terminal is adapted to engage the screw shell of the socket and the inner terminal the center contact of the socket. A wire 20 having a green colored insulation is electrically connected to the ferrule terminal 14 and leads to the center contact 16 of the socket 17. The reflecting surface 18 of the lamp 19 inserted into socket 17 is colored green, green being a conventional color for signifying correctness.

An electric conductor 21 having a red insulation is soldered to the head 22 of the short bolt 23, the nut 15 thereon serving as a contact point. The other extremity of the wire is soldered to the center contact 24 of the shell 25. The lamp 26 within this shell glows against a red reflecting surface 27 which indicates incorrect wiring.

Both lamp sockets are electrically connected to bottom 30 of the lower cell by a conductor 31 which is soldered to both shells. As shown this conductor is non-insulated and in reality is an extension of the coil spring 2.

A conductor 32 for contacting the socket of the lamp during the testing procedure has a bifurcated terminal for connection to the binding post 9 by the binding nut. The length of the conductor should be sufficient to allow of easy working. At the testing end of the conductor a spring clip 33 may be provided so that the fixture may be gripped more easily.

The manner of use is as follows. The detector is inserted by its head into the lamp socket. By reason of its length the detector can be used with equal facility even when the lamp shades are in place. It is to be understood, however, that the detector is to be used before the current is turned on and just after the wiring is installed. Starting with the premise that correct wiring in the marked-wire system requires that the black or live wire be connected to the center contact and the white or ground wire to the screw shell, it will be seen by an inspection of the diagrammatic view of the wiring shown in Figure 3 that when the wiring is correct, upon touching the shell of the lamp socket with the spring clip 33, the circuit is closed through conductors 8, 32, 20 and 31, whereupon the light with the green background is lighted. In case the black wire is wrongly connected to the shell the circuit is closed through conductors 8, 32, 21 and 31 and the light with a red background is lighted. The clip 33 may be attached to any part of the fixture or to any suitable ground.

In the event of short circuit (shown by dotted line 34 in Figure 3) both of the above numbered circuits are closed and both lamps are lighted.

All that has been said above in the description of my preferred embodiment is offered by way of illustration and not limitation. I do not wish to be limited to the exact structure of the preferred embodiment shown and described, or to any particular material used in the construction of parts, or to the design of parts, but desire protection as against any variations in structure which utilize the principle of my invention and fall within the purview of my invention and are within the spirit and scope of the following claims.

The invention having been set forth, what is claimed as new and useful is:

1. In an electrically operated detector for identifying electric conductors and testing for short circuits, an elongated receptacle means, said receptacle means containing a battery, indicating lamps and lamp sockets within said receptacle means, an electric conductor running to the shells of said lamp sockets from one terminal of said battery, a head portion on said receptacle means comprising a ferrule of conducting material adapted to engage the interior of the lamp socket to be tested, a center contact insulated from said ferrule, one conductor electrically connecting said ferrule with the center contact of one of said indicating lamp sockets, another conductor electrically connecting said center contact in the head portion of said receptacle means with the center-contact of the other indicating lamp socket, a conductor running from the other terminal of the battery to the base of the receptacle means, and a long conductor attached to said last mentioned conductor for contacting the fixture to be tested whereby one of the circuits is closed.

2. A self contained electrically operated detector for use in the marked wire system for simultaneously indentifying electric conductors, testing for short circuits and testing for grounding of fixtures, comprising a tubular receptacle having a head portion adapted to engage the interior of the lamp socket to be tested, said head portion comprising an outer ferrule, a center contact insulated from said ferrule, battery means within said receptacle, two indicators disposed within said receptacle, colored conductors, a conductor running from said center contact of said head portion to one of said indicators, another colored conductor running from said ferrule to the other of said indicators, a third conductor running from one terminal of said battery to the exterior of said receptacle, conducting means resiliently connecting the other end of said battery means to said indicators, and a test conductor connected to said third conductor for contacting the exterior of the lamp socket.

3. In an electrically operated detector for identifying electric conductors and testing for short circuits, an elongated receptacle means, said receptacle containing a battery, indicating devices within said receptacle means, an electric conductor running to the shells of said indicating devices from one terminal of said battery, a head portion on said receptacle means comprising a ferrule of conducting material adapted to engage the interior of the lamp socket to be tested, a center contact insulated from said ferrule, one conductor electrically connecting said ferrule with one of said indicating devices, another conductor electrically connecting said center contact in the head portion of said receptacle means with the other indicating device, a conductor running from the other terminal of the battery to the base of the receptacle means, and a long conductor attached to said last mentioned conductor for contacting the fixture to be tested whereby one of the circuits is closed.

Signed at Fall River in the county of Bristol, State of Massachusetts, this Nineteenth day of March, 1927.

ADAM PETER ADAM.